United States Patent
Park et al.

[11] Patent Number: 5,941,975
[45] Date of Patent: Aug. 24, 1999

[54] METHOD OF USING A LATCH FOR CONTROLLING SIMULTANEOUS ACCESS TO A CRITICAL SECTION

[75] Inventors: Soon-Young Park; Jin-Soo Lee, both of Daejeon; Young-Chul Park, Daegu, all of Rep. of Korea

[73] Assignees: Electronics and Telecommunications Research Institute, Daejeon, Rep. of Korea; Korea Telecommunication Authority, Seoul, Rep. of Korea

[21] Appl. No.: 08/649,159

[22] Filed: May 17, 1996

[30] Foreign Application Priority Data

Aug. 21, 1995 [KR] Rep. of Korea ............ 95-25697

[51] Int. Cl.⁶ .................. G06F 13/14; G06F 9/00
[52] U.S. Cl. .......... 710/200; 709/100; 711/152; 707/8
[58] Field of Search .............. 395/726–732, 395/670–678, 856–871; 711/147–153; 707/8

[56] References Cited

U.S. PATENT DOCUMENTS

| | | | |
|---|---|---|---|
| 5,161,227 | 11/1992 | Dias et al. | 395/674 |
| 5,175,861 | 12/1992 | Hara et al. | 395/726 |
| 5,263,146 | 11/1993 | Mishima | 711/163 |
| 5,263,155 | 11/1993 | Wang | 707/8 |
| 5,263,161 | 11/1993 | Barth et al. | 711/152 |
| 5,276,844 | 1/1994 | Aebi et al. | 395/425 |
| 5,317,749 | 5/1994 | Dahlen | 395/726 |
| 5,339,443 | 8/1994 | Lockwood | 395/732 |
| 5,341,491 | 8/1994 | Ramanujan | 711/152 |
| 5,386,586 | 1/1995 | Papadopoulos | 395/377 |
| 5,450,592 | 9/1995 | McLeod | 395/674 |

OTHER PUBLICATIONS

"Data Requirements for Implementation of N–Process Mutual Exclusion Using a Single Shared Variable" by James E. Burns et al, appearing in *Journal of the Association for Computing Machinery*, vol. 29, No. 1, Jan. 1982, pp. 183–205.

"Semaphore Primitives and Starvation–Free Mutual Exclusion" by Eugene W. Stark et al, appearing in *Journal of the Association for Computing Machinery*, vol. 29, No. 4, Oct. 1982, pp. 1049–1072.

*Primary Examiner*—Ayaz R. Sheikh
*Assistant Examiner*—Sumati Lefkowitz
*Attorney, Agent, or Firm*—Antonelli, Terry, Stout & Kraus, LLP

[57] ABSTRACT

The present invention relates to a latch structure for effectively controlling the users' simultaneous accesses to a critical section in a system supporting a multi-user environment and a method for managing the same. The latch is a data structure, having a mutual exclusion variable and a pointer to a request queue, used in providing a schedule for user requests. It is an object of the present invention to provide a latch structure and a method for managing the same which are simple and are capable of improving the concurrence of the users' accesses to a critical section through the implementation of a complete latch satisfying all of the conditions required by the critical section. The concurrence for the multi-user system and the performance of the entire system can be greatly improved.

7 Claims, 3 Drawing Sheets

METHOD OF USING A LATCH FOR CONTROLLING SIMULTANEOUS ACCESS TO A CRITICAL SECTION

FIELD OF THE INVENTION

The present invention relates to a latch structure for effectively controlling multiple users' simultaneous accesses to a critical section in a system supporting a multi-user environment and a method for managing the same. The latch is a data structure used in providing a schedule for user requests.

BACKGROUND OF THE INVENTION

In a system for supporting a multi-user environment, it is needed to designate and manage shared data in an appropriate size in a critical section for maintaining consistency, and improving the concurrence, of the shared data. A critical section is a shared data area in which only one user request can be executed at a time. The performance of the overall system depends significantly on how the users' simultaneous accessing to the critical section is synchronized. In other words, the performance of the overall system depends largely on how the critical section is implemented.

Implementation of the critical section must satisfy three conditions, i.e., a mutual exclusion, progress and a bounded waiting. The mutual exclusion condition requires control of user requests trying to simultaneously enter the critical section in order to allow only one user request to enter it at a time. The progress condition requires that any one user trying to enter the critical section must be allowed to enter it if the others do not use it. The bounded waiting condition requires that the user trying to enter the critical section must be allowed to enter it after the lapse of a predetermined period of time instead of endless waiting until the required condition is satisfied, even though it is not yet satisfied. Satisfaction of the three conditions above ensures the maintenance of integrity for the shared data and the effective concurrence control of multiple users.

Examples of methods for synchronizing user requests desiring to enter a critical section include use of a semaphore provided by an operating system and implementation of a latch. The latch is the data structure encapsulated by a shared variable, i.e., mutual exclusion variable (hereinafter, referred to as "mutex") for scheduling user requests trying to enter the critical section. The semaphore provided by the operating system is a very expensive resource not only because of the limit on the number of semaphores but also because of the accompanied system call even though it is capable of controlling the users' simultaneous accesses to the critical section through the use of P and V operations and can be implemented simply. Such method for supporting the critical section using the semaphore does not provide very good performance for a system using the same. On the other hand, the method for supporting the critical section through implementation of a latch can support the multi-user environment at a lesser cost than the semaphore method using the system call does.

However, the existing latch has a problem in that the time required to hold the mutex is increased in proportion to the size of critical section. This is because the user continues to hold the mutex during entering and executing of the critical section, since the latch is implemented under the concept regarding the mutual exclusion variable, mutex, itself as the latch. Another problem is in that the latch structure and the method for the same cannot satisfy all the three conditions mentioned above and, in the alternative, the structure and method would become very complicated in order to satisfy all three conditions.

SUMMARY OF THE INVENTION

Accordingly, the present invention is provided for eliminating the foregoing problems, and it is an object of the present invention to provide a latch structure and a method for managing the same which are simple and are capable of improving the concurrence of the users' accesses to a critical section through the implementation of a complete latch satisfying all of the conditions required by the critical section.

The preceding objects should be construed as merely presenting a few of the more pertinent features and applications of the invention. Many other beneficial results can be obtained by applying the disclosed invention in a different manner or modifying the invention within the scope of the disclosure. Accordingly, other objects and a fuller understanding of the invention may be had by referring to both the summary of the invention and the detailed description, below, which describe the preferred embodiment in addition to the scope of the invention defined by the claims considered in conjunction with the accompanying drawings.

A management method of a latch for supporting critical section according to the present invention is defined by the claims with a specific embodiment shown in the attached drawings.

According to the first embodiment of the present invention, a latch acquisition method supporting a critical section through use of a mutual exclusion variable and latch management means for controlling the management of the latch comprises the steps of: rendering a user to require the latch management means to give a chance to acquire the latch so that the user can enter the critical section; rendering the latch management means to allow the user to occupy the mutual exclusion variable and rendering the latch management means to register the user request; rendering the user to reset the mutual exclusion variable; and rendering the user to acquire the latch.

According to the second embodiment of the present invention, a latch release method supporting a critical section through use of a mutual exclusion variable and a latch management means for controlling the management of the latch comprises the steps of: (a) rendering a user to ask the latch management means for the latch release chance so that a user can release a previously acquired latch; (b) rendering the latch management means to check whether there is any other user request except for the user request in the latch queue; (c) rendering the latch management means to put the user request to sleep, or suspend the request, depending on an occupied condition of a mutual exclusion variable, if there is not any other user request except for the user request in the latch queue at the decision step(b); (d) rendering the user to delete the user request from the latch queue and to release the mutual exclusion variable on the condition that there is no other than the user request in the latch queue; and (e) rendering the latch management means to determine what the next user request is, thereafter delete the user request from the queue and wake up, or restore, the next sleeping, or suspended, user request, if there is any other user request except the user request in the latch queue at said decision step (b).

The more pertinent and important features of the present invention have been outlined above in order that the detailed description of the invention which follows will be better understood and that the present contribution to the art can be fully appreciated. Additional features of the invention described hereinafter form the subject of the claims of the invention. Those skilled in the art can appreciate that the conception and the specific embodiment disclosed herein may be readily utilized as a basis for modifying or designing other structures for carrying out the same purposes of the present invention. Further, those skilled in the art can realize that such equivalent constructions do not depart from the spirit and scope of the invention as set forth in the claims.

BRIEF DESCRIPTION OF THE DRAWINGS

For fuller understanding of the nature and objects of the invention, reference should be made to the following detailed description taken in conjunction with the accompanying drawings in which.

Similar reference charters refer to similar parts throughout the several views of the drawings.

DETAILED DESCRIPTION OF THE INVENTION

Figure 1:
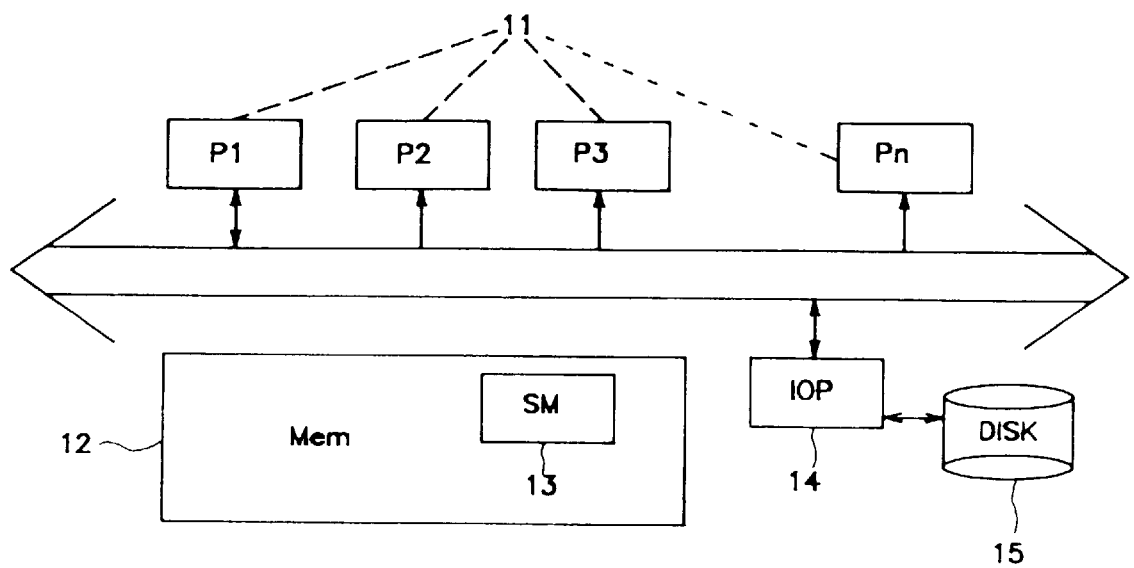
FIG. 1 shows a schematic diagram of a hardware in which the present invention is utilized.

Referring to FIG. 1, it represents a hardware structure to which the present invention is applied. Processors P1–Pn access a shared memory area 13 in memory area 12 via a common bus. An input/output dedicated processor 14 functions to control the processors P1–Pn's accesses to an auxiliary memory 15. The present invention can be operated in a general hardware environment in which a single processor or a multiprocessor system is included.

Figure 2:
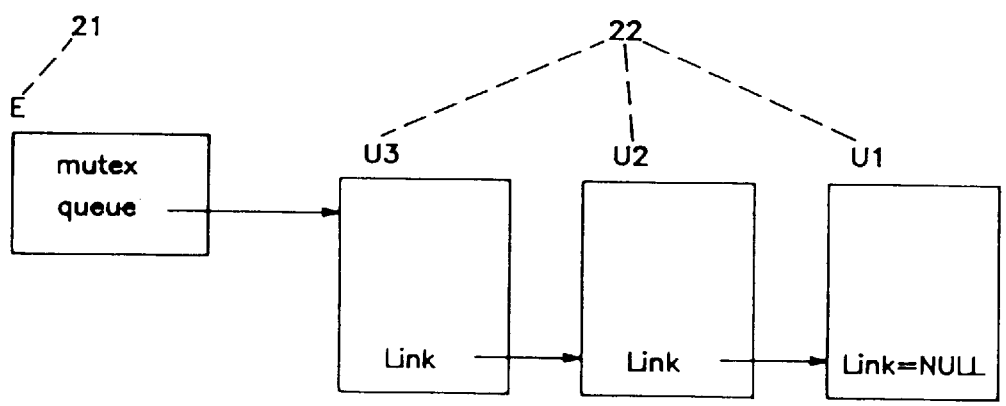
FIG. 2 illustrates a latch structure in which the present invention is used.

Referring now to FIG. 2, there is illustrated a latch structure to which the present invention is applied. A latch 22 has a data structure 21 expressed in the form of C language as follows:

```
typedef struct {
        char          mutex:
        T_TRANS       * queue;
} E_LATCH;
``` where T_Trans is the structure which represents a user request requiring the latch. The latch structure E_LATCH according to the present invention comprises a queue and a mutex used for the queue, which maintains the order of user requests 22 trying to enter a critical section. The mutex is a mutual exclusion variable and is used for maintaining the integrity of queue management. To change a queue that is a list for user requests desiring the acquisition of latch, the mutex must be occupied at first. In implementing the mutual exclusion for the mutex, it is important that both one operation for reading the value of the mutex and another operation for setting the read value of the mutex to another value must be performed as an automatic instruction. To ensure such automacity for implementation of mutual exclusion, the mutual exclusion should be implemented in the assembly language.

A method for managing the latch supporting the critical section utilizes the mutual exclusion variable, mutex, and a latch management means. The latch management means is a central processor and controls the management of the latch.

In general, the term "sleep" to be used below means suspending a process and in this example, causing a user request to be suspended. The term "wake up" means restoring the suspended process and in this example, releasing the suspended user request.

Figure 3:
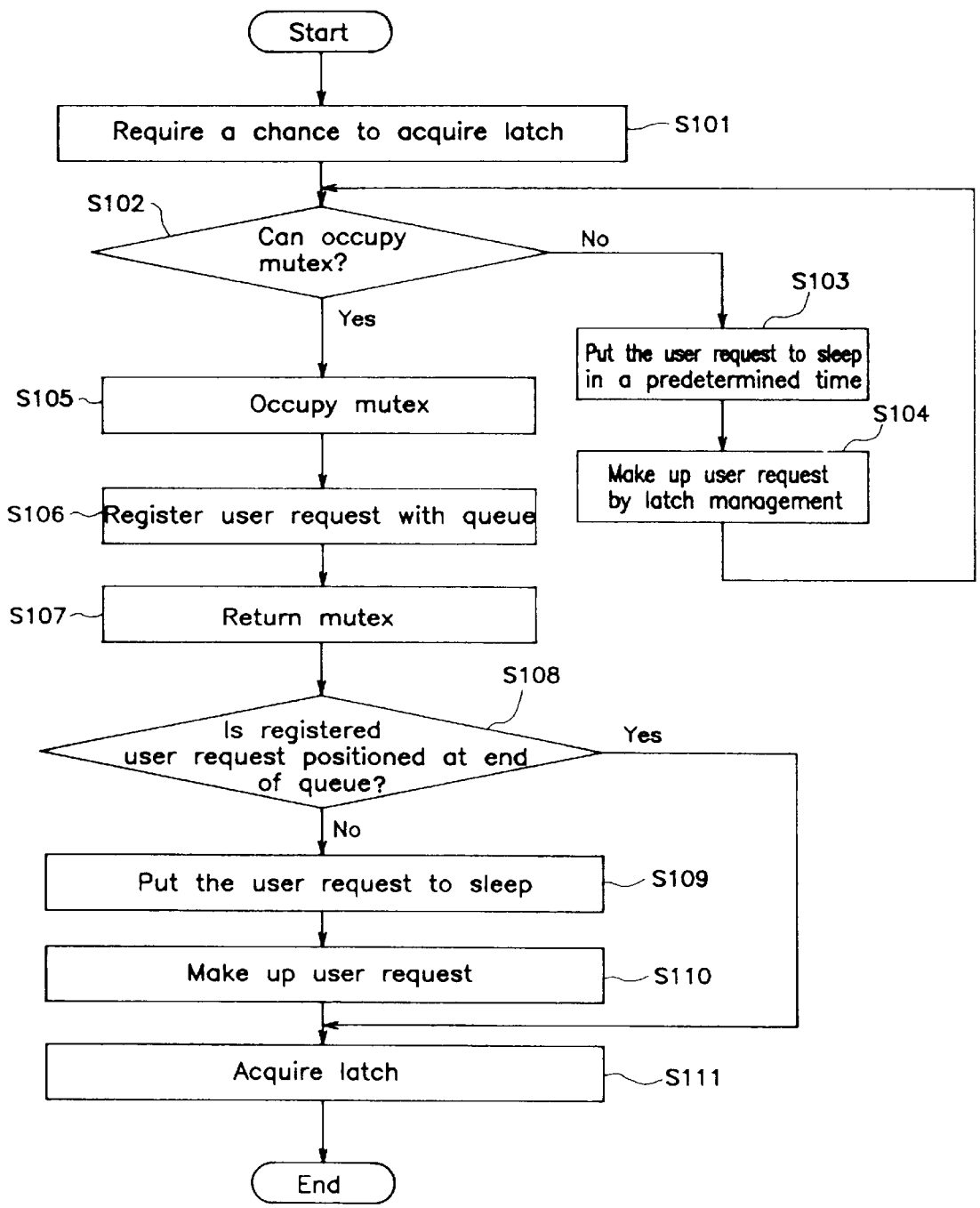
FIG. 3 is a flowchart that illustrates acquisition of a latch according to the present invention.

Referring to FIG. 3, it shows a flowchart describing an operation of acquisition of latch.

In block S101, a user requests the latch management means to give a chance of acquisition of latch in order to enter the critical section.

Next, as shown in decision block S102, the latch management means determines if the user can occupy the mutex. If not, then the latch management means puts the user request to sleep as shown by block S103. After the lapse of a predetermined period of time, the latch management means wakes up the user request as shown by block S104. The program returns to the decision block S102.

In the decision block S102, if it is determined that the user can occupy the mutex, then the latch management means allows the user to occupy the mutex as shown by the block S105.

Next, in a block S106, the latch management means registers the user request in the queue. Then, the user resets the mutex as shown in block S107. Next, in decision block S108, the latch management means determines if the registered user request is ready to perform by recognizing the registered user request positioned at the end of the queue. If so, then the user acquires the latch as shown by the block S111. If not, then the latch management means puts the registered user request to sleep as shown by the block S109. Next, in block S110, another user request wakes up the sleeping user request. Then, the user acquires the latch as shown by the block S111.

Figure 4:
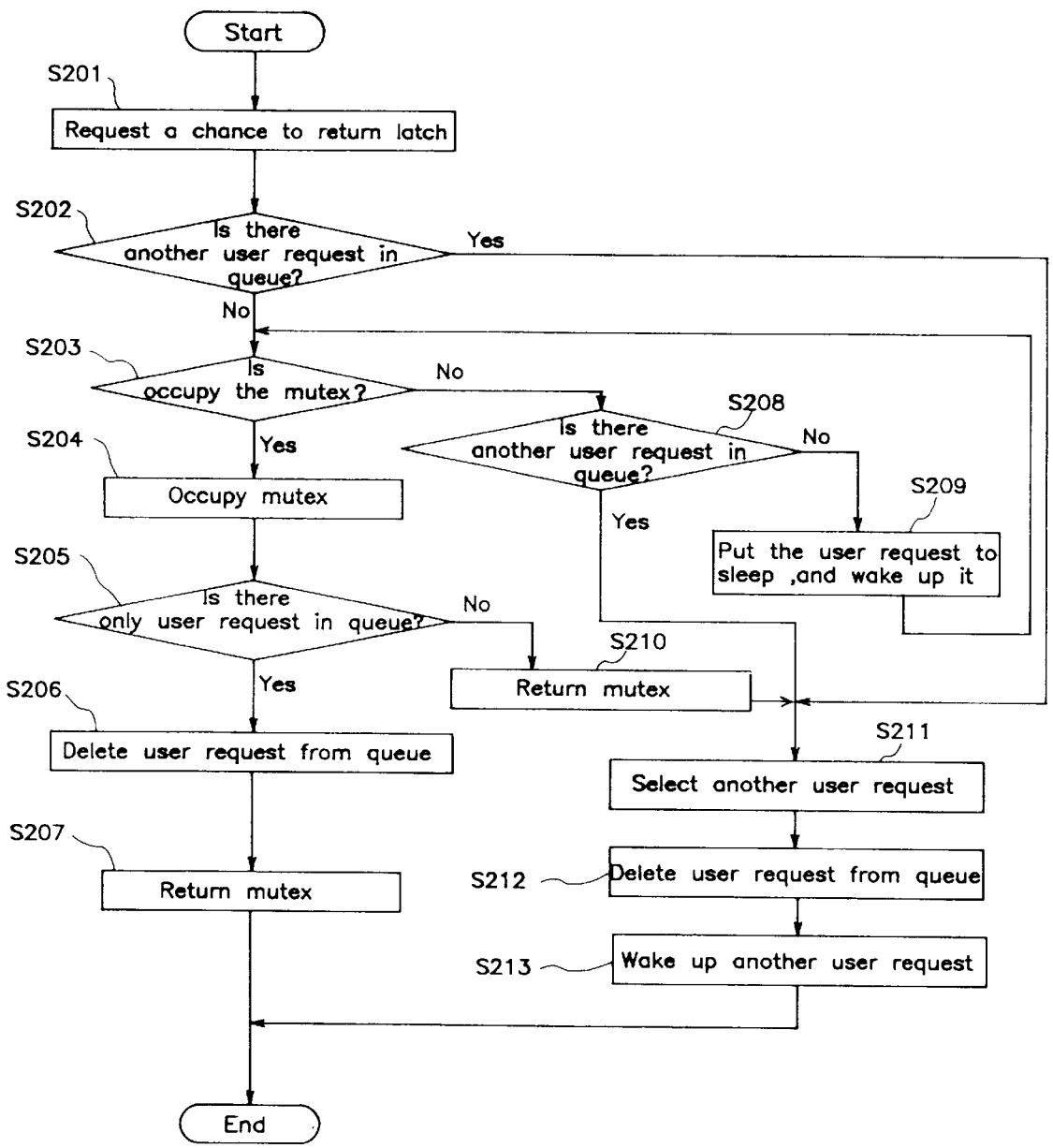
FIG. 4 is a flowchart that illustrates releasing of a latch according to the present invention.

Referring to FIG. 4, it illustrates the flowchart on an operation of releasing a latch.

In a block S201, the user asks the latch management means for the latch releasing chance in order to release the previously acquired latch. Next, the latch management means checks whether there is any other user request except for the user request in the latch queue as shown by decision block S202. If there is any other user request in the latch queue at the decision block S202, the latch management means determines which is the next user request as shown by block S211. If there is not any other user request in the latch queue at the decision block S202, the latch management means checks the possibility of a user occupying the mutex as shown by decision block S203. If a user cannot occupy the mutex at the decision block S203, the latch management means checks whether there is any other user request except for the user request in the latch queue as shown by decision block S208. If there is any other user request in the latch queue at the decision block S208, the latch management means determines which is the next user request as shown by the block S211. If there is not any other user request in the latch queue at the decision block S208, the latch management means puts the user request to sleep. After the lapse of the predetermined period of time, the latch management means wakes up the user request as shown in block S209. The program returns to the decision block S203. If a user can occupy the mutex in the decision block S203, the latch management means occupy the mutex as shown in block S204.

Next, in decision block S205, the latch management means checks whether there is any other than the user request in the latch queue. If there is none other than the user request in the decision block S205, the latch management means deletes the registered user request from the queue as shown by block S206, and thereafter the user releases the mutex and terminates the program as shown block S207. If there is any other than the user request in the decision block S205, the user releases the mutex as shown in block S210.

Next, in the block S211, the latch management means checks which is the next user request. The latch management means deletes the user request from the queue as shown in block S212. Then, the latch management means wakes up the next sleeping user request, and thereafter terminates the program as shown in block S213.

As described above, according to the present invention, the concurrence for the multi-user system and the performance of the entire system can be greatly improved.

Although the present invention and its advantages have been described in detail, it should be understood that various changes, substitutions and alterations can be made herein without departing from the spirit and scope of the invention as defined by the appended claims.

What is claimed is:

1. A latch acquisition method for supporting a critical section in a multiple-user processing system through use of a mutual exclusion variable and latch management means for controlling the management of the latch, said method comprising the steps of:

(a) requesting, by a user requiring the latch management means, the latch so that the user can enter the critical section;

(b) allowing, by the latch management means, the user to occupy the mutual exclusion variable and registering, by the latch management means, a user request resulting from step (a) in a request queue;

(c) resetting, by the user, the mutual exclusion variable; and (d) acquiring the latch by the user.

2. A latch acquisition method in claim 1, wherein said step (b) comprises the steps of:

(b-1) determining, by the latch management means if the user can occupy the mutual exclusion variable;

(b-2) if not in said step (b-1), putting the user request to sleep by the latch management means;

(b-3) after the lapse of a predetermined period of time, waking up the sleeping user request, by the latch management means;

(b-4) rendering the program to go back to said step (b-1);

(b-5) if it is determined in said step (b-1) that the user can occupy the mutual exclusion variable, allowing, by the latch management means, the user to occupy the mutual exclusion variable; and (b-6) registering the user request by the latch management means.

3. A latch acquisition method claimed in claim 1, wherein said step (d) comprises the step of:

(d-1) determining, by the latch management means, if the registered user request is ready to perform;

(d-2) if so in said step (d-1), acquiring the latch by the user;

(d-3) if not in said step (d-1), putting the registered user request to sleep by the latch management means;

(d-4) waking up the sleeping user request by utilizing another user request; and (d-5) acquiring the latch by the user.

4. A latch release method supporting a critical section in a multiple-user processing system through use of a mutual exclusion variable and latch management means for controlling the management of the latch, said method comprising the steps of:

(a) requesting, by a user, the latch management means for the latch release so that the user can release a previously acquired latch;

(b) checking, by the latch management means, whether there is any other user request except for the user request in a latch queue;

(c) putting the user request to sleep, by the latch management means, depending on an occupied condition of the mutual exclusion variable, if there is no other user request except for the user request in the latch queue at said checking step (b);

(d) deleting, by the user, the user request from the latch queue and releasing an occupied mutual exclusion variable if there is none other than the user request in the latch queue; and (e) determining, by the latch management means, what the next user request is, thereafter deleting the user request from the queue and waking up the next sleeping user request, if there is any other user request except for the user request in the latch queue at said checking step (b).

5. A latch release method claimed in claim 4, wherein said step (c) comprises the steps of:

(c-1) determining, by the latch management means, the possibility of the user occupying the mutual exclusion variable;

(c-2) checking, by the latch management means, whether there is any other user request except for the user request in the latch queue, if the user cannot occupy the mutual exclusion variable in said determining step (c-1);

(c-3) rendering the program to go to said step (e), if there is any user request other than the user request in the latch queue in said checking step (c-2);

(c-4) putting the user request to sleep, by the latch management means, for a predetermined period of time, if there is no other user request except for the user request in the latch queue in said checking step (c-2);

(c-5) after the lapse of the predetermined period of time, waking up the user request, by the latch management means, and thereafter rendering the program to go to said step (c-1); and (c-6) rendering the latch management means to occupy the mutual exclusion variable, if the user can occupy the mutual exclusion variable in said determining step (c-1).

6. a latch release method claimed in claim 5, wherein said step (d) comprises the steps of:

(d-1) checking, by the latch management means, whether there is any requests other than the user request in the latch queue;

(d-2) deleting, by the latch management means, the user request from the latch queue, if the user can occupy the mutual exclusion variable in said determining step (c-1);

(d-3) releasing, by the user, the mutual exclusion variable; and (d-4) releasing, by the latch management means, the mutual exclusion variable and rendering the program to go to said step (e), if the user can occupy the mutual exclusion variable in said determining step (c-1).

7. A latch release method claimed in claim 4, wherein said step (e) comprises the steps of:

(e-1) determining, by the latch management means, which is the next user request;

(e-2) deleting, by the latch management means, the user request from the latch queue; and (e-3) waking up the next user request by the latch management means.

* * * * *